(12) United States Patent
Corder

(10) Patent No.: US 6,401,745 B1
(45) Date of Patent: Jun. 11, 2002

(54) FIRE HYDRANT AUTOMATIC SHUT-OFF VALVE

(76) Inventor: Harold Eugene Corder, 23777 Mulholland Hwy. #127, Calabasas, CA (US) 91302

( * ) Notice: Subject to any disclaimer, the term of this patent is extended or adjusted under 35 U.S.C. 154(b) by 0 days.

(21) Appl. No.: 09/829,278

(22) Filed: Apr. 9, 2001

(51) Int. Cl.[7] .......................... E03B 9/04; F16K 17/14; F16K 15/03; F16K 17/28; F16K 43/00
(52) U.S. Cl. ................ 137/300; 137/68.14; 137/68.15; 137/315.01; 137/527; 137/797
(58) Field of Search ................. 137/68.11, 68.14, 137/68.15, 68.16, 71, 300, 527, 315.01, 15.02, 797

(56) References Cited

U.S. PATENT DOCUMENTS

| | | | | |
|---|---|---|---|---|
| 2,017,600 A | * | 10/1935 | Lofton | 137/68.14 |
| 2,804,317 A | * | 8/1957 | Prater | 137/68.14 |
| 3,002,775 A | * | 10/1961 | Mueller et al. | 137/68.14 |
| 3,586,019 A | * | 6/1971 | Thomas et al. | 137/68.14 |
| 4,023,584 A | * | 5/1977 | Rogers et al. | 137/68.14 |
| 4,077,422 A | * | 3/1978 | Brinkley et al. | 137/68.14 |
| 4,119,111 A | * | 10/1978 | Allread | 137/68.14 |
| 4,562,962 A | * | 1/1986 | Hartman | 137/68.14 |
| 4,762,140 A | * | 8/1988 | Davis | 137/68.14 |
| 4,790,342 A | * | 12/1988 | Segal | 137/68.14 |
| 5,244,006 A | * | 9/1993 | Pettesch | 137/68.14 |
| 5,609,179 A | * | 3/1997 | Knapp | 137/68.11 |
| 5,699,823 A | * | 12/1997 | Thomson | 137/68.15 |
| 5,803,110 A | * | 9/1998 | Segal | 137/68.14 |
| 5,941,268 A | * | 8/1999 | Ross, Jr. | 137/68.14 |

\* cited by examiner

*Primary Examiner*—George L. Walton
(74) *Attorney, Agent, or Firm*—Goldstein Law Offices, P.C.

(57) ABSTRACT

A fire hydrant automatic shut-off valve including a cylindrical sleeve having an open lower end and an open upper end. The open lower end receives a water supply stand pipe therein. The open upper end receives an open lower end of the fire hydrant thereon whereby the open lower end of the fire hydrant is in communication with the water supply stand pipe. A pair of flaps is hingedly coupled with the open upper end of the cylindrical sleeve. The pair of flaps close to a corresponding horizontal position to effectively seal the cylindrical sleeve to prevent water from flowing from the water supply stand pipe to the fire hydrant. A trigger sleeve is slidably disposed within the open upper end of the cylindrical sleeve. The trigger sleeve extends downwardly to push the pair of flaps outwardly to allow water to flow freely from the water supply stand pipe to the fire hydrant.

9 Claims, 2 Drawing Sheets

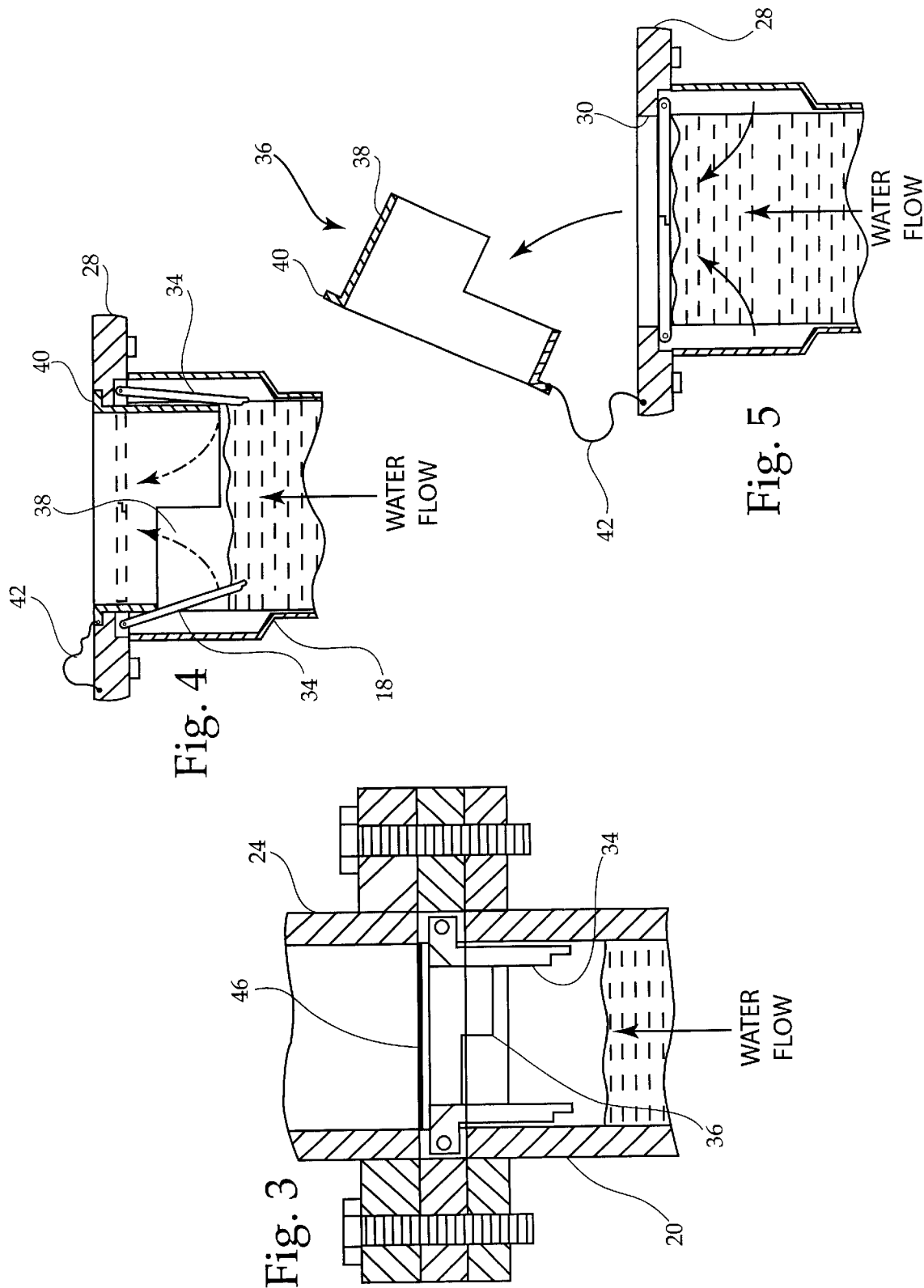

FIRE HYDRANT AUTOMATIC SHUT-OFF VALVE

BACKGROUND OF THE INVENTION

The present invention relates to a fire hydrant automatic shut-off valve and more particularly pertains to stopping the flow of water once a fire hydrant has been removed from a water supply line.

Many automobile accidents occur in urban settings. Unfortunately, in these settings many fire hydrants are positioned along the roads. Thus, some of these accidents result in contact with these fire hydrants where in some instances, the fire hydrant is removed. This will expose the fire hydrant's connection to the main water line thereby causing an uncontrollable flow of water from the main water line that usually takes a significant amount of time to neutralize. The end result being the waste of thousands of gallons of water prior to the main water line being shut down. What is needed is a way to immediately stop the flow of water once a fire hydrant has been removed from its connection with the main water line.

The present invention attempts to solve the abovementioned problem by providing a device that essentially is a valve that will close on the main water line once the fire hydrant has been removed from its seat.

The use of valve assembly devices is known in the prior art. More specifically, valve assembly devices heretofore devised and utilized for the purpose of shutting off the flow of water are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,609,179 to Knapp discloses an automatic shut-off valve for a fire hydrant, using a spring activated disk and rod assembly to close the pipe in the event of a breakage. U.S. Pat. No. 4,762,140 to Davis discloses a valve capable of shutting off the flow of water for a sprinkler head. U.S. Pat. No. 5,803,110 to Segal discloses a fire hydrant assembly.

While these devices fulfill their respective, particular objective and requirements, the aforementioned patents do not describe a fire hydrant automatic shut-off valve for stopping the flow of water once a fire hydrant has been removed from a water supply line.

In this respect, the fire hydrant automatic shut-off valve according to the present invention substantially departs from the conventional concepts and designs of the prior art, and in doing so provides an apparatus primarily developed for the purpose of stopping the flow of water once a fire hydrant has been removed from a water supply line.

Therefore, it can be appreciated that there exists a continuing need for a new and improved fire hydrant automatic shut-off valve which can be used for stopping the flow of water once a fire hydrant has been removed from a water supply line. In this regard, the present invention substantially fulfills this need.

SUMMARY OF THE INVENTION

In the view of the foregoing disadvantages inherent in the known types of valve assembly devices now present in the prior art, the present invention provides an improved fire hydrant automatic shut-off valve. As such, the general purpose of the present invention, which will be described subsequently in greater detail, is to provide a new and improved fire hydrant automatic shut-off valve which has all the advantages of the prior art and none of the disadvantages.

To attain this, the present invention essentially comprises a cylindrical sleeve having an open lower end and an open upper end. The cylindrical sleeve has a pair of outwardly formed pockets disposed below the open upper end. The open lower end receives a water supply stand pipe therein. The open lower end has a lower mounting plate disposed thereon for securement to the water supply stand pipe. The open upper end receives an open lower end of the fire hydrant thereon whereby the open lower end of the fire hydrant is in communication with the water supply stand pipe. The open upper end of the sleeve has an upper mounting plate disposed thereon for securement to the fire hydrant. The upper mounting plate has a ring plate secured to a lower surface thereof. The ring plate has an inwardly extending annular flange. The flange corresponds with a depth of the outwardly formed pockets. A pair of flaps is hingedly coupled with the annular flange of the ring plate of the cylindrical sleeve. The pair of flaps close to a corresponding horizontal position to effectively seal the cylindrical sleeve to prevent water from flowing from the water supply stand pipe to the fire hydrant. A trigger sleeve is slidably disposed within the open upper end of the cylindrical sleeve. The trigger sleeve includes a hollow main portion having a cylindrical flange extending outwardly therefrom. The cylindrical flange is seated atop the annular flange of the ring plate whereby the hollow main portion extends downwardly to push the pair of flaps into the outwardly formed pockets to allow water to flow freely from the water supply stand pipe to the fire hydrant. The trigger sleeve has a safety line secured thereto. The safety line has a free end secured to the ring plate.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fire hydrant automatic shut-off valve which has all the advantages of the prior art valve assembly devices and none of the disadvantages.

It is another object of the present invention to provide a new and improved fire hydrant automatic shut-off valve which may be easily and efficiently manufactured and marketed.

It is a further object of the present invention to provide a new and improved fire hydrant automatic shut-off valve which is of durable and reliable construction.

An even further object of the present invention is to provide a new and improved fire hydrant automatic shut-off valve which is susceptible of a low cost of manufacture with regard to both materials and labor, and which accordingly is then susceptible of low prices of sale to the consuming public, thereby making such a fire hydrant automatic shut-off valve economically available to the buying public.

Even still another object of the present invention is to provide a new and improved fire hydrant automatic shut-off valve for stopping the flow of water once a fire hydrant has been removed from a water supply line.

Lastly, it is an object of the present invention to provide a new and improved fire hydrant automatic shut-off valve including a cylindrical sleeve having an open lower end and an open upper end. The open lower end receives a water supply stand pipe therein. The open upper end receives an open lower end of the fire hydrant thereon whereby the open lower end of the fire hydrant is in communication with the water supply stand pipe. A pair of flaps is hingedly coupled with the open upper end of the cylindrical sleeve. The pair of flaps close to a corresponding horizontal position to effectively seal the cylindrical sleeve to prevent water from flowing from the water supply stand pipe to the fire hydrant. A trigger sleeve is slidably disposed within the open upper end of the cylindrical sleeve. The trigger sleeve extends downwardly to push the pair of flaps outwardly to allow water to flow freely from the water supply stand pipe to the fire hydrant.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional front view of the preferred embodiment illustrated in use.

FIG. 4 is a cross-sectional front view of the preferred embodiment illustrating the flow of water therethrough.

FIG. 5 is a cross-sectional front view of the present invention illustrating the removal of the trigger block thereof.

The same reference numerals refer to the same parts through the various figures.

DESCRIPTION OF THE PREFERRED EMBODIMENT

Figure 1:
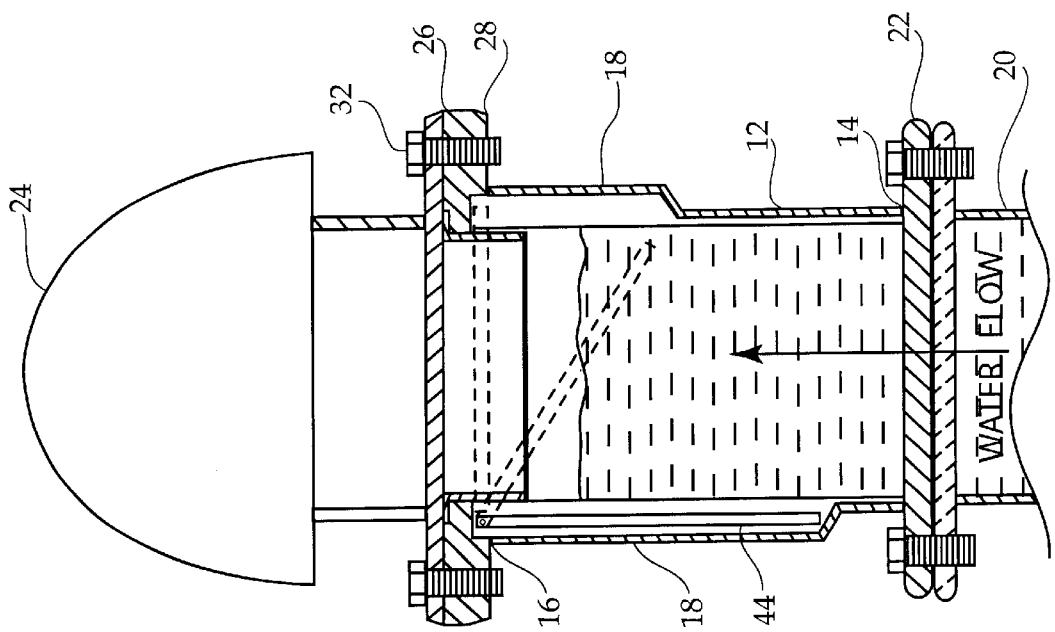
FIG. 1 is a cross-sectional front view of the preferred embodiment of the fire hydrant automatic shut-off valve constructed in accordance with the principles of the present invention.

With reference now to the drawings, and in particular, to figures one through five thereof, the preferred embodiment of the new and improved fire hydrant automatic shut-off valve embodying the principles and concepts of the present invention and generally designated by the reference number 10 will be described.

Specifically, it will be noted in the various figures that the device relates to a fire hydrant automatic shut-off valve for stopping the flow of water once a fire hydrant has been removed from a water supply line. In its broadest context, the device consists of a cylindrical sleeve, a pair of flaps, and a trigger sleeve. Such components are individually configured and correlated with respect to each other so as to attain the desired objective.

The cylindrical sleeve 12 has an open lower end 14 and an open upper end 16. The cylindrical sleeve 12 has a pair of outwardly formed pockets 18 disposed below the open upper end 16. The open lower end 14 receives a water supply stand pipe 20 therein. The open lower end 14 has a lower mounting plate 22 disposed thereon for securement to the water supply stand pipe 20. The open upper end 16 receives an open lower end of the fire hydrant 24 thereon whereby the open lower end of the fire hydrant 24 is in communication with the water supply stand pipe 20. The open upper end 16 of the sleeve 12 has an upper mounting plate 26 disposed thereon for securement to the fire hydrant 24. The upper mounting plate 26 has a ring plate 28 secured to a lower surface thereof. The ring plate 28 has an inwardly extending annular flange 30. The flange 30 corresponds with a depth of the outwardly formed pockets 18. The fire hydrant 24 is secured to the upper mounting plate 26 and the ring plate 28 by said bolts 32 consistent with the hydrants belt pattern on the top ring. breakaway bolts 32) so that contact with the fire hydrant by a vehicle will cause the fire hydrant 24 to break away from the water supply stand pipe 20 without disrupting the integrity of the present invention.

The pair of flaps 34 are hingedly coupled with the annular flange 30 of the ring plate 28 of the cylindrical sleeve 12. The pair of flaps 34 close to a corresponding horizontal position to effectively seal the cylindrical sleeve 12 to prevent water from flowing from the water supply stand pipe 20 to the fire hydrant 24. Note figures one and five.

The trigger sleeve 36 is slidably disposed within the open upper end 16 of the cylindrical sleeve 12. The trigger sleeve 36 includes a hollow main portion 38 having a cylindrical flange 40 extending outwardly therefrom. The cylindrical flange 40 is seated atop the annular flange 30 of the ring plate 28 whereby the hollow main portion 38 extends downwardly to push the pair of flaps 34 into the outwardly formed pockets 18 to allow water to flow freely from the water supply stand pipe 20 to the fire hydrant 24. Note figures one and four. The trigger sleeve 36 has a safety line 42 secured thereto. The safety line 42 has a free end secured to the ring plate 28. Note FIG. 5. In the event of an accident, the fire hydrant 24 will be removed from the water supply stand pipe 20 thereby causing the trigger sleeve 36 to be removed from the cylindrical sleeve 12 outwardly of the open upper end 16. The safety line 42 will prevent the trigger sleeve 36 from being propelled similar to a projectile. This will allow the pair of flaps 34 to close up the open upper end 16, effectively preventing the outward flow of water from the water supply stand pipe 20 whereupon the water supply can be shut off while the necessary repairs are completed.

Figure 2:
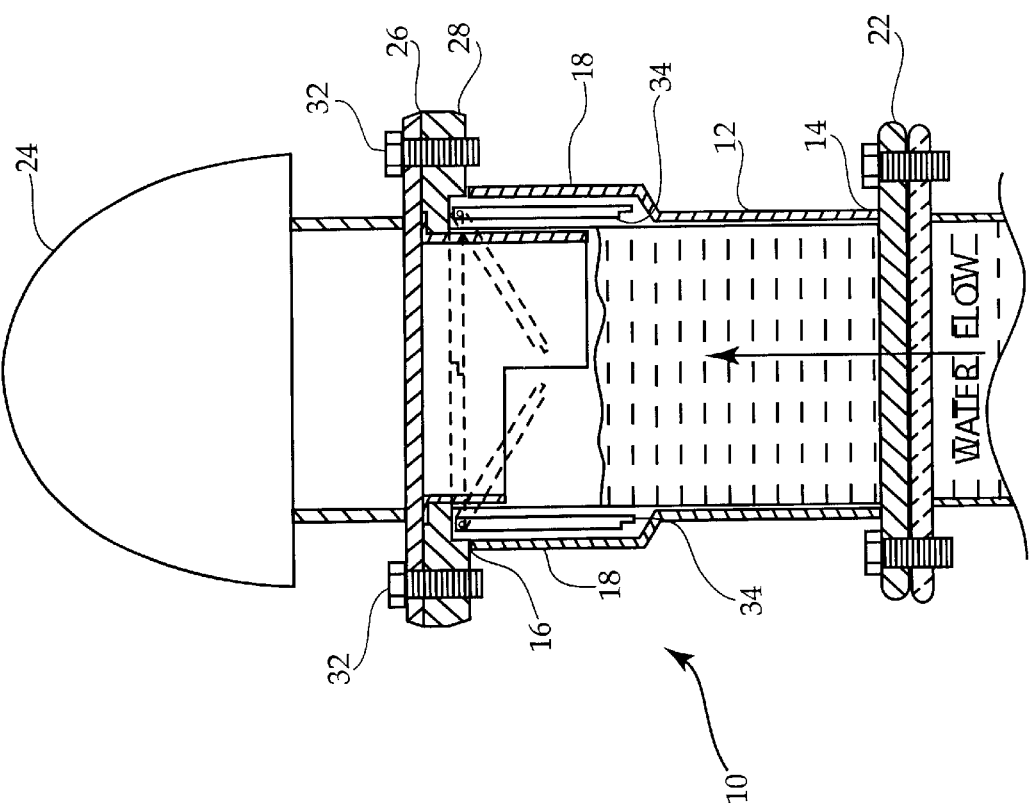
FIG. 2 is a cross-sectional front view of an alternate embodiment of the present invention.

A second embodiment of the present invention is shown in FIG. 2 and includes substantially all of the components of the present invention wherein the pair of flaps 34 are replaced by a single flap 44 that will be contained in a larger pocket 18 in the cylindrical sleeve 12.

A third embodiment of the present invention is shown in FIG. 3 and includes substantially all of the components of the present invention wherein a restraining cable 46 is connected to the open lower end of the fire hydrant 24 to hold the trigger sleeve 36 within the open upper end 16 of the cylindrical sleeve 12 to keep the flap's 34 in an open position. Once the fire hydrant 24 is forcibly removed, the retraining cable 46 will be removed allowing the trigger sleeve 36 to be propelled outwardly of the cylindrical sleeve 12 and the flaps 34 to close.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fire hydrant automatic shut-off valve for stopping the flow of water once a fire hydrant has been removed from a water supply line comprising, in combination:

a cylindrical sleeve having an open lower end and an open upper end, the cylindrical sleeve having a pair of outwardly formed pockets disposed below the open upper end, the open lower end receiving a water supply stand pipe therein, the open lower end having a lower mounting plate disposed thereon for securement to the water supply stand pipe, the open upper end receiving an open lower end of the fire hydrant thereon whereby the open lower end of the fire hydrant is in communication with the water supply stand pipe, the open upper end of the sleeve having an upper mounting plate disposed thereon for securement to the fire hydrant, the upper mounting plate having a ring plate secured to a lower surface thereof, the ring plate having an inwardly extending annular flange, the flange corresponding with a depth of the outwardly formed pockets;

a pair of flaps hingedly coupled with the annular flange of the ring plate of the cylindrical sleeve, the pair of flaps closing to a corresponding horizontal position to effectively seal the cylindrical sleeve to prevent water from flowing from the water supply stand pipe to the fire hydrant; and a trigger sleeve slidably disposed within the open upper end of the cylindrical sleeve, the trigger sleeve including a hollow main portion having a cylindrical flange extending outwardly therefrom, the cylindrical flange being seated atop the annular flange of the ring plate whereby the hollow main portion extends downwardly to push the pair of flaps into the outwardly formed pockets to allow water to flow freely from the water supply stand pipe to the fire hydrant, the trigger sleeve having a safety line secured thereto, the safety line having a free end secured to the ring plate;

whereby when the fire hydrant is removed from the standpipe, the flow of water pushes the safety line attached trigger sleeve out of the cylinder so that the flaps move to a closed position, thereby shutting off the water from the standpipe.

2. A fire hydrant automatic shut-off valve for stopping the flow of water once a fire hydrant has been removed from a water supply line comprising, in combination:

a cylindrical sleeve having an open lower end and an open upper end, the open lower end receiving a water supply stand pipe therein, the open upper end receiving an open lower end of the fire hydrant thereon whereby the open lower end of the fire hydrant is in communication with the water supply stand pipe;

a pair of flaps hingedly coupled with the open upper end of the cylindrical sleeve, the pair of flaps closing to a corresponding horizontal position to effectively seal the cylindrical sleeve to prevent water from flowing from the water supply stand pipe to the fire hydrant; and a trigger sleeve slidably disposed within the open upper end of the cylindrical sleeve to push the pair of flaps outwardly to allow water to flow freely from the water supply stand pipe to the fire hydrant;

whereby when the fire hydrant is removed from the standpipe, the flow of water pushes the safety line attached trigger sleeve out of the cylinder so that the flaps move to a closed position, thereby shutting off the water from the standpipe.

3. The fire hydrant automatic shut-off valve as set forth in claim two, wherein the cylindrical sleeve has a pair of outwardly formed pockets disposed below the open upper end for receiving the pair of flaps therein when the trigger sleeve is disposed within the open upper end of the cylindrical sleeve.

4. The fire hydrant automatic shut-off valve as set forth in claim two, wherein the open lower end of the cylindrical sleeve has a lower mounting plate disposed thereon for securement to the water supply stand pipe.

5. The fire hydrant automatic shut-off valve as set forth in claim two, wherein the open upper end of the sleeve has an upper mounting plate disposed thereon for securement to the fire hydrant.

6. The fire hydrant automatic shut-off valve as set forth in claim five, wherein the upper mounting plate has a ring plate secured to a lower surface thereof, the ring plate having an inwardly extending annular flange, the flange corresponding with a depth of the outwardly formed pockets.

7. The fire hydrant automatic shut-off valve as set forth in claim six, wherein the pair of flaps is hingedly coupled with the annular flange of the ring plate of the cylindrical sleeve.

8. The fire hydrant automatic shut-off valve as set forth in claim seven, wherein the trigger sleeve includes a hollow main portion having a cylindrical flange extending outwardly therefrom, the cylindrical flange being seated atop the annular flange of the ring plate whereby the hollow main portion extends downwardly to push the pair of flaps outwardly.

9. The fire hydrant automatic shut-off valve as set forth in claim eight, wherein the trigger sleeve has a safety line secured thereto, the safety line having a free end secured to the ring plate.

* * * * *